(12) United States Patent
Colas et al.

(10) Patent No.: US 6,415,190 B1
(45) Date of Patent: Jul. 2, 2002

(54) METHOD AND DEVICE FOR EXECUTING BY A SINGLE PROCESSOR SEVERAL FUNCTIONS OF DIFFERENT CRITICALITY LEVELS, OPERATING WITH HIGH SECURITY

(75) Inventors: Gérard Colas, Versailles; Olivier Le Borgne, Montigny le Bretonneux; Robert Villard, Plaisir, all of (FR)

(73) Assignee: Sextant Avionique, Velizy Villacoublay (FR)

( * ) Notice: Subject to any disclaimer, the term of this patent is extended or adjusted under 35 U.S.C. 154(b) by 0 days.

(21) Appl. No.: 09/380,066

(22) PCT Filed: Feb. 20, 1998

(86) PCT No.: PCT/FR98/00337
§ 371 (c)(1),
(2), (4) Date: Aug. 25, 1999

(87) PCT Pub. No.: WO98/38572
PCT Pub. Date: Sep. 3, 1998

(30) Foreign Application Priority Data

Feb. 25, 1997 (FR) ............................................. 97 02212

(51) Int. Cl.$^7$ .............................. G06F 9/46; G06F 9/48; G06F 9/52; G06F 11/28
(52) U.S. Cl. ...................... 700/79; 700/306; 709/107; 714/55; 711/163; 214/195
(58) Field of Search ................................ 700/9, 14, 21, 700/33, 79, 296, 306; 709/107; 711/152, 163, 164; 714/55; 214/195

(56) References Cited

U.S. PATENT DOCUMENTS

| | | | |
|---|---|---|---|
| 4,138,726 A | | 2/1979 | Girault et al. |
| 4,333,144 A | * | 6/1982 | Whiteside et al. ........... 709/107 |
| 4,799,159 A | * | 1/1989 | Davidson et al. .............. 700/79 |
| 5,506,963 A | * | 4/1996 | Ducateau et al. ........... 709/107 |
| 5,550,736 A | * | 8/1996 | Hay et al. ....................... 700/79 |
| 5,560,570 A | * | 10/1996 | Pierson et al. ................. 700/79 |

* cited by examiner

Primary Examiner—William M. Treat
(74) Attorney, Agent, or Firm—Oblon, Spivak, McClelland, Maier & Neustadt, P.C.

(57) ABSTRACT

A processor for executing several functions. The processor has access to an addressable space including memories for program and for data and input/output registers. The method of operation includes the allocation of a right of access to each function, the dividing of the addressable space and of partitions, each associated with the access right of a function, and the dividing of the time of use of the processor into cyclic time slices associated with the access right of a function. At the start of each new time slice, it is confirmed that the processor has terminated the execution of the previous function. The method further includes the activation of the tasks of the corresponding function. During each access by a processor to an addressable area, the access right of the current time slice is compared with that associated with the accessed are, with an error signal being transmitted in case of an inconsistency.

20 Claims, 3 Drawing Sheets

METHOD AND DEVICE FOR EXECUTING BY A SINGLE PROCESSOR SEVERAL FUNCTIONS OF DIFFERENT CRITICALITY LEVELS, OPERATING WITH HIGH SECURITY

BACKGROUND OF THE INVENTION

1. Field of the Invention

The present invention relates to a method and a device allowing the execution by a single processor of several functions for controlling an industrial process, some of these functions requiring a high level of safety of operation.

DISCUSSION OF THE BACKGROUND

It applies in particular, but not exclusively, to computers carried on board aerodynes which cater for various flight control functions. It emerges that the current developments in such equipment are aimed at ever greater automation of the flight control tasks, and especially, the piloting of aerodynes. This tendency is leading to equipment of ever greater complexity, bulk, energy consumption and cost and which is ever more difficult to maintain.

To solve this problem, it has been sought to integrate such equipment and make it modular. To do this, an architecture has already been proposed which brings together various electronic modules into electronics racks or cabinets, these modules performing the acquisition of the information arising from the sensors and other on-board equipment, as well as the formulation of flight commands.

The grouping together of several functions comprising several tasks executed cyclically, within the same module, has also been attempted, it being possible for the necessary computations and processing operations to be performed by means of one and the same processor used in timesharing mode.

However, in the equipment installed on board aerodynes, a level of criticality is generally associated with each function carried out, and with each datum used by the functions, each level of criticality corresponding to a maximum failure rate required by the authorities for certifying aeronautical equipment. Thus, the functions with the most critical level correspond to those whose failure may have catastrophic consequences. These functions must therefore exhibit a very low probability of failure (less than $10^{-9}$ faults per flying hour). Likewise, the most critical data are the data which, if they are no longer available or erroneous, may give rise to catastrophic events. Of course, the criticality of the data bears no relation to the criticality of the functions which use them, it being possible for one and the same datum to be used by several functions with different levels of criticality.

The sharing of the same processor by several functions therefore involves tasks with different levels of criticality being executed by the same processor, thus considerably raising the risk that less critical functions, such as the functions related to the maintenance of the equipment, might disturb or even shut down the execution of the most critical functions. It is then necessary to make special provisions so that the functions carried out, and especially the most critical ones, are executed with the level of safety required by the authorities who certify on-board equipment.

To this end, redundant architectures have been proposed in which all the modules, especially those which cater for critical functions, are triplicated in such a way that the critical functions may be carried out even following a failure. However, this solution is of little benefit with a view to reducing costs, the number of modules required, the power consumed and dissipated, the availability (failure rate) and the ease of maintenance of the equipment.

Furthermore, the redundant architecture solution amounts to duplicating not only critical functions, but also noncritical functions, such as the maintenance functions.

SUMMARY OF THE INVENTION

The object of the present invention is to eliminate these drawbacks To this end, it proposes a method for the execution by a single processor of several functions each grouping together several tasks, the processor having addressing access to an addressable space comprising memories for a program and for data, and input and output registers allowing the processor to communicate with its environment.

According to the invention, this method is characterized in that it comprises:

the allocating of a right of access to each function to be executed by the processor, the dividing of the space addressable by the processor into addressable partitions and the associating of each addressable partition with the access right of one of the functions, in such a way as to allow each function to access at least one addressable partition, the dividing of the time of use of the processor into cyclic time slices, and the associating of each cyclic time slice with the access right of one of the functions, in such a way that each function is executed in the course of at least one time slice, at the start of each new time slice, the confirming that the processor has terminated the execution of the previous function, and the transmitting of an error signal to the processor if the execution of the previous function has not terminated, the updating of a current access right corresponding to the access right associated with the new time slice, and the activating of the tasks of the corresponding function, and during each access by the processor to an addressable partition, the reading of the access right associated with the accessed addressable partition, the comparing of this access right with the access right associated with the current time slice, and the transmitting of an error signal to the processor in the case in which the comparison reveals an inconsistency.

These provisions allow the execution in a totally independent manner of several functions by a single processor, and thus make it possible to prevent an addressing error made by the processor when executing a function from giving rise to modifications of memory areas allocated to other functions, and simultaneously to prevent an execution error which causes the exceeding of the time allocated to the function from disturbing the execution of the subsequent function by the processor. The errors which may appear in the course of a cyclic time slice are therefore strictly confined to this time slice, and thus, cannot disturb the functions executed in the course of the subsequent time slices.

In this way, it is possible to group functions with various levels of criticality together into the same module comprising a single processor, without engendering an increase in the risks of a fault.

It is therefore no longer necessary to use a totally duplicated or triplicated architecture, only the most critical functions being duplicated or triplicated. The invention thus allows an appreciable reduction in the cost, bulk and power dissipated by such equipment.

Additionally, since the faults are confined solely to the function affected, maintenance of the equipment, and especially the fault locating and repair operations are made considerably easier.

Generally, the functions executed in respect of the real-time control of an industrial process comprise several tasks which are executed periodically, each task having a level of criticality. In this context, the method according to the invention furthermore comprises:

the dividing of the partitions of the addressable space into addressable areas, and the associating of access rights with these areas, the allocating of the access rights of the areas of each addressable partition to the tasks of the function corresponding to the addressable partition as a function of the respective levels of criticality of the tasks, during the activating of each task, the updating of a current access right, and during each access to an addressable area, the comparing of the access right associated with the addressable area, with the access right of the task currently being executed.

Advantageously, the method according to the invention furthermore comprises the allocating to each task of a minimum and maximum execution time, the checking at the end of the execution of each task that these times are complied with, and the transmitting of an error signal if this condition is not fulfilled.

This provision allows more accurate checking of the execution of the tasks by the processor, and thus, better detection of errors.

To further limit the consequences of addressing errors, the areas of the space addressable by the processor which can be used at each time slice are separated by unused areas, thus making it possible to prevent some addressing errors from giving rise to erroneous modifications of the memory or erroneous output-accesses.

According to another feature of the invention, the unused areas of the memories for a program and for data are filled with code executable by the processor making it possible to stop or shut down the latter, thereby making it possible to cause the exceeding of the maximum time allocated to the task currently being executed.

BRIEF DESCRIPTION OF THE DRAWINGS

An embodiment of the device according to the invention will be described below, by way of nonlimiting example, with reference to the appended drawings in which.

DETAILED DESCRIPTION OF THE PREFERRED EMBODIMENTS

Figure 1:
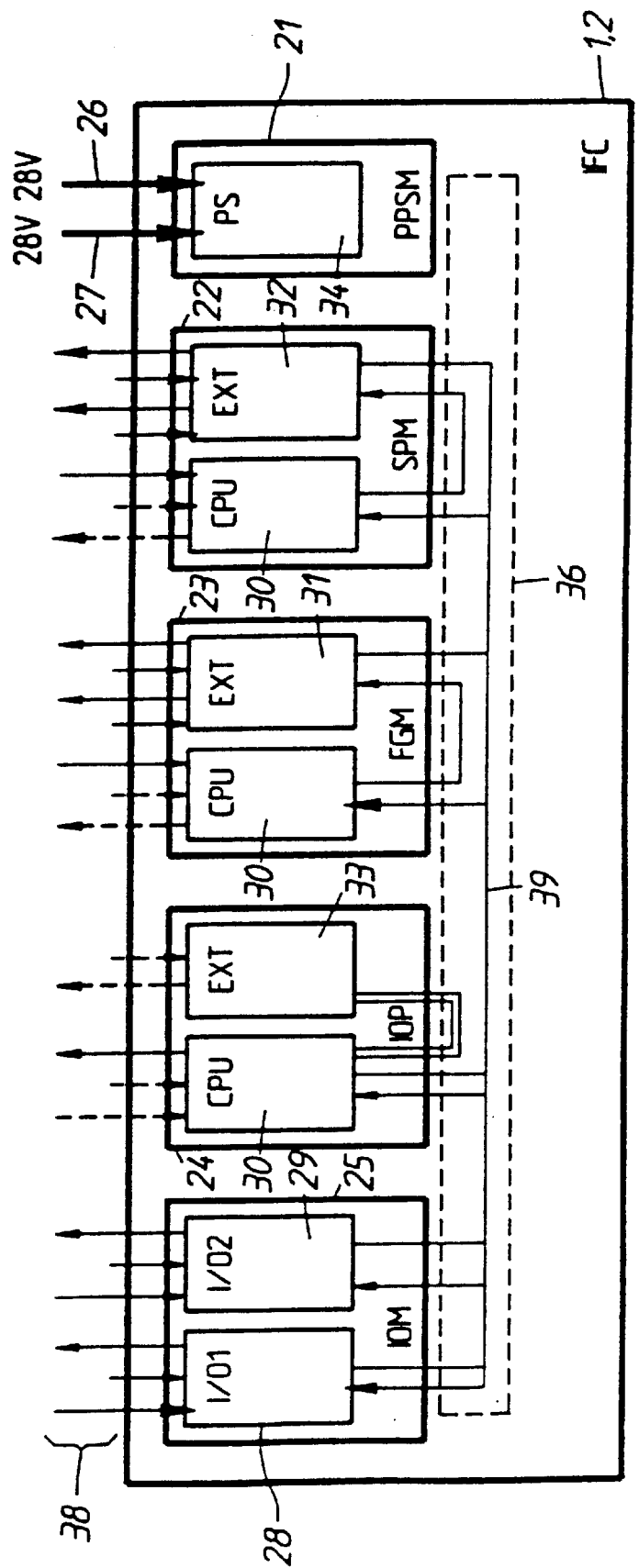
FIG. 1 represents an item of electronic equipment installed on board an aerodyne, which brings together several modules.

The electronic equipment 1 represented in FIG. 1 takes the form of an electronic rack into which are inserted and interconnected a plurality of modules 21 to 25, namely a module IOM 25 responsible for managing the noncritical, analogue and discrete data inputs and outputs, a module IOP 24 responsible for concentrating the noncritical digital data, a module FGM 23 responsible for processing the critical data related to automatic control, a module SPM 22 responsible for catering for the function for preventing the risks of stalling, and a primary supply module PPSM 21 which groups together the functions of pre-regulation of the 28-volt primary voltages provided by two general supply lines 26, 27 of the aerodyne, the other modules 22 to 25 comprising a secondary supply circuit consisting of low-cost voltage converters, catering for the production of supply voltages adapted to their own needs.

The other modules 22 to 24, with the exception of the module 25 for managing the analogue and discrete data, each comprise a processing unit situated on one and the same microprocessor card 30 and a specific, but similarly structured, expansion card 31 to 33 catering in particular for the input and output tasks for the module. The module for managing the analogue and. discrete data 25 also comprises two cards 28, 29, but the latter are both dedicated to the management of the input and outputs and do not include a processor.

It should be noted that two identical modules in several items of equipment, such as 1, may perform the same processing in redundant mode or complementary processing operations, depending on the criticality of the functions carried out. This architecture therefore offers numerous possibilities of adaptation and configuration.

Figure 2:
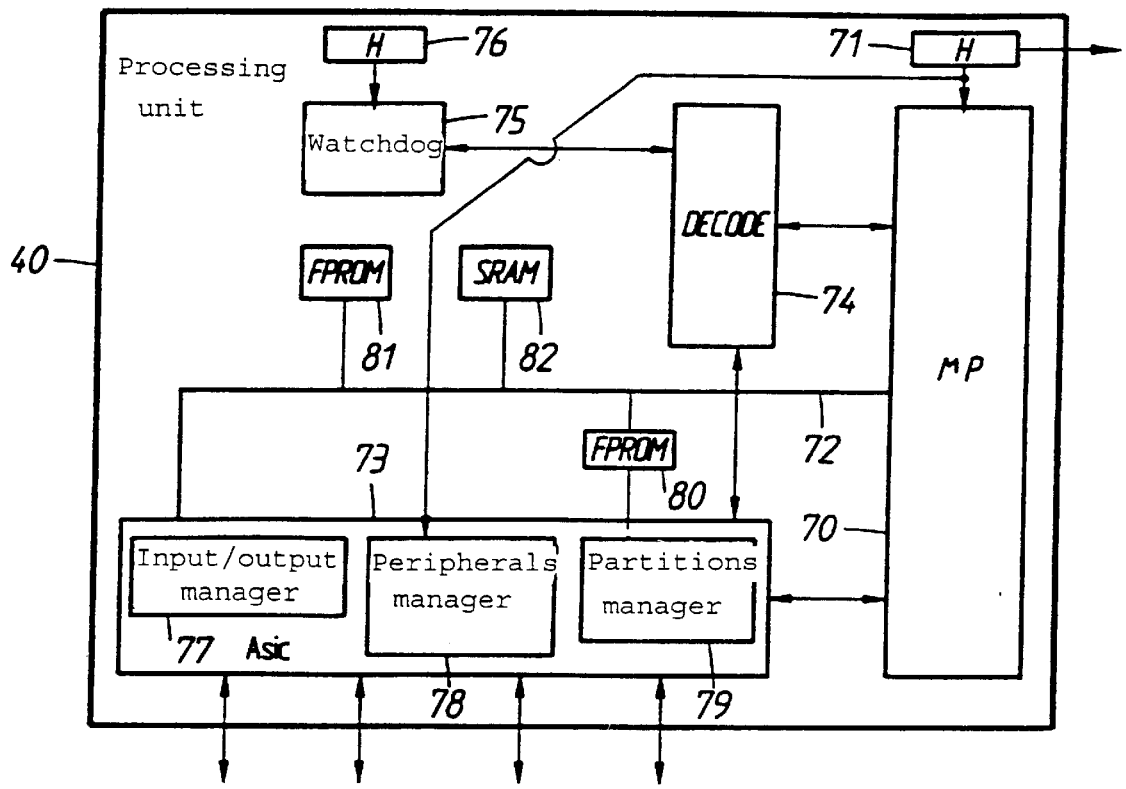
FIG. 2 shows the processing unit of a module in greater detail.

In FIG. 2, the processing unit 40 comprises a microprocessor 70 regulated by a clock 71, and the manner of operation of which is overseen by a "watchdog" circuit 75 which is regulated by another clock 76. The microprocessor 70 is linked by way of an address and data bus 72 to a program memory of nonvolatile type 81, and to a data memory of volatile type 82, as well as to an ASIC circuit 73. The access addresses provided by the microprocessor 70 are processed by an address decoder 74 before being sent over the bus 72.

The processing units of the modules 22 to 24 are identical. However, the functions executed by each of these various cards may be of very different kinds, of variable durations, and above all, of very different levels of criticality. It is therefore necessary to take special measures to ensure the proper execution of these functions which comprise several tasks. Thus, for example, the module IOP 24 caters for the following functions:

the concentration in the processing assembly 1, 2, of the noncritical data originating from the various systems of the aerodyne, bound, in particular, for the electronic instrumentation system of the instrument panel, the formulation of the parameters and check logic arising from and destined for redundant functions, the collection and shaping of the data intended for the flight recorder, the generation of alarms intended for the crew and the activation of visual and audible warning devices, the communication with other equipment, such as the ground proximity warning system (GPWS), and the testing of the system and the locating of glitches, this latter task having a lesser degree of criticality than the others.

To bar one function from disturbing another, and especially, a less critical function from shutting down the execution of a more critical function, the ASIC circuit 73 comprises:

a circuit 77 for managing the inputs/outputs of the processing unit 40, which may be of ARINC digital type 429, discrete, or serial, a circuit for managing peripherals 78 comprising means of fast transfer (DMA) data between areas addressable by the microprocessor 70, and means for counting time and for generating cyclic interrupts heading for the microprocessor 70, so as to delimit cyclic times slots, and a circuit 79 for checking accesses to the space addressable by the microprocessor 70 as a function of access rights assigned to the various tasks executed by the microprocessor, these access rights being stored in another nonvolatile memory 80 addressed by the bus 72 and whose data port and linked to the ASIC circuit 73.

The access checking circuit 79 comprises means 79 for checking the addressing planes of the space addressable by the microprocessor 70, this space comprising the memories 81, 82 and input and output registers which can be accessed by the circuit for managing the inputs/outputs 77.

Additionally, the memory 80 is connected to the high-order bits of the address bus, thus making it possible to associate access rights stored in the memory with each set, for example of 512 bytes, of the space addressable by the microprocessor.

Figure 3:
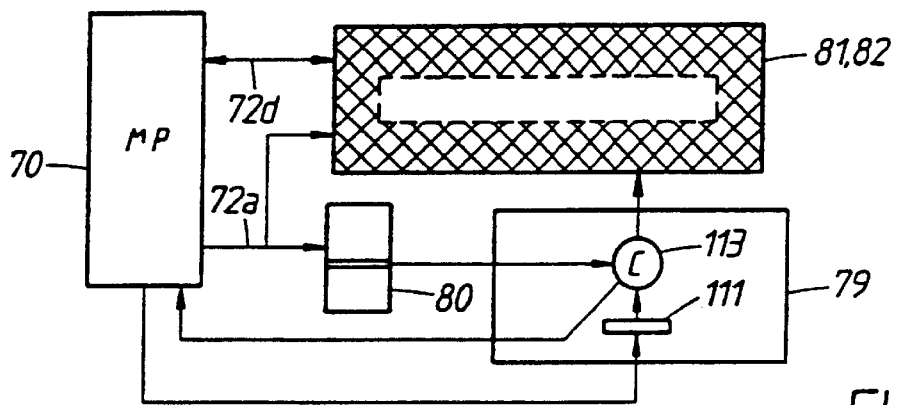
FIG. 3 illustrates the manner of operation of the processing unit according to the invention.

As represented in FIG. 3, the circuit 79 for checking accesses to the space addressable by the microprocessor 70 comprise a register 111 containing the authorized access right corresponding to the current cyclic time slice, this right being updated by the microprocessor 70 at the start of each new time slice, as marked by an interrupt. This circuit is connected to the data bus of the nonvolatile memory 80 which contains the access rights of each area of the space addressable by the microprocessor 70.

Figure 4:
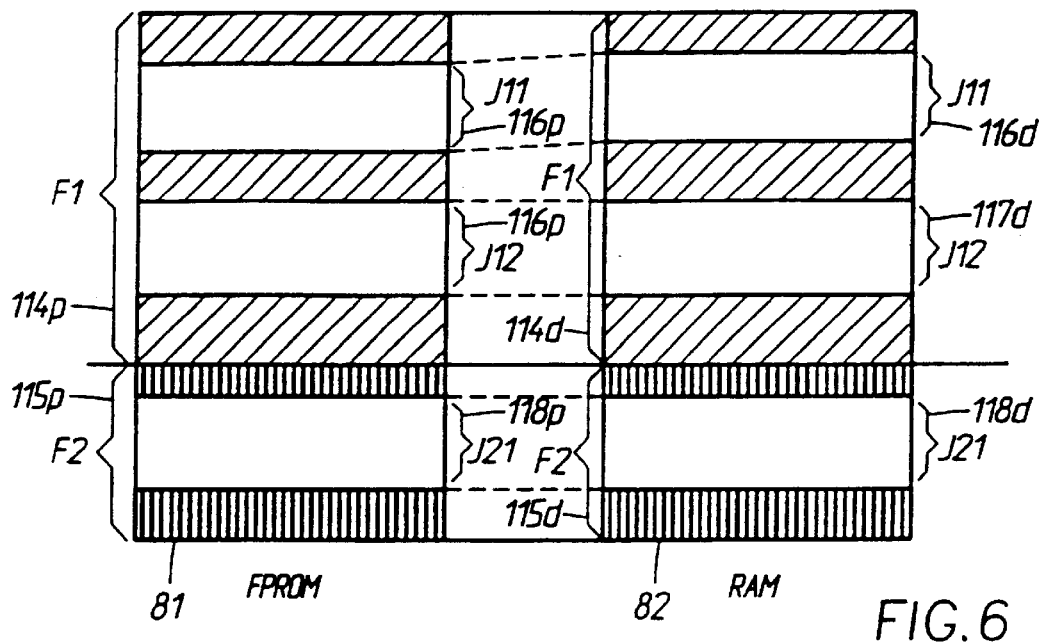
FIG. 4 represents the organization of a part of the memory of a processing unit.

In FIG. 4, the memory containing the programs 81 and the memory containing the data 82 are divided into partitions 114p, 115p, 114d, 115d, allocated respectively to two distinct functions F1, F2, the partitions 114p and 115p respectively containing the program executable by the microprocessor 70 making it possible to carry out the functions F1, F2 and the partitions 114d and 115d the data used exclusively, by F1, F2 respectively. Since each function comprises several tasks J11, J12, J21, the partitions 114p, 115p, 114d, 115d are in turn divided into several areas 116p, 117p, 118p, 116d, 117d, 118d, each memory area containing the program, or as the case may be, being usable to store data, by a task Jij of the corresponding function Fi.

Thus, the space addressable by the microprocessor is structured into partitions and into areas inside the same partition, each area being associated with an access right.

Advantageously, the memory areas usable by each cyclic task are separated from one another by unused areas of memory (hatched areas shown in FIG. 4), thereby enabling some addressing errors to be made to have no effect in respect of the other functions.

When the microprocessor 70 performs an access to one of the memories 81, 82, at a. given address, the latter is sent over the address bus 72a both to the memory area addressed in the addressable space of the microprocessor 70, and to the memory 80 which then provides the checking service 79 with the access rights of the addressed area. The checking service 79 comprises a comparator 113 which compares the access rights originating from the register 111 with the access rights read from the memory 80.

If the comparator detects a difference, it bars the microprocessor 70 from accessing the memory area addressed if dealing with a write-access, and generates a memory access violation interrupt bound for the microprocessor 70. When dealing with a read-access, it simply signals that the read has been performed in a barred area. If the access rights read from the memory 80 and those stored in the register 111 coincide, the data may be exchanged over the data bus 72d between the, microprocessor and the memory area.

Figure 5:
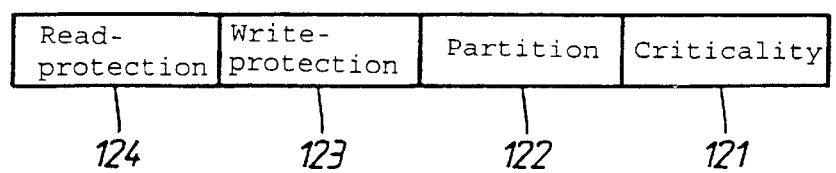
FIG. 5 represents the coding of an access right stored in memory.

In FIG. 5, the access right words stored in the memory 80 may each comprise four fields, namely a field 121 corresponding to a level of criticality, a field 122 corresponding to a partition number, a write-protection field 123, and read-protection field 124.

According to a variant of the invention, the comparator 113 can furthermore authorize access to an area corresponding to the same function as that of the current time slice, and whose access right level is lower than that of the current task, this being so as to establish a hierarchy in the access rights while executing the tasks of a function.

This detection of addressing errors makes it possible to neutralize the mistakes by precluding any erroneous modification of the memory or erroneous access to an output register, and to halt the execution of the task or of the function at fault, as a function of the seriousness of the mistake. Doing this prevents any propagation of the mistake to the other functions executed by the microprocessor, and to the other parts of the addressable space.

Figure 6:
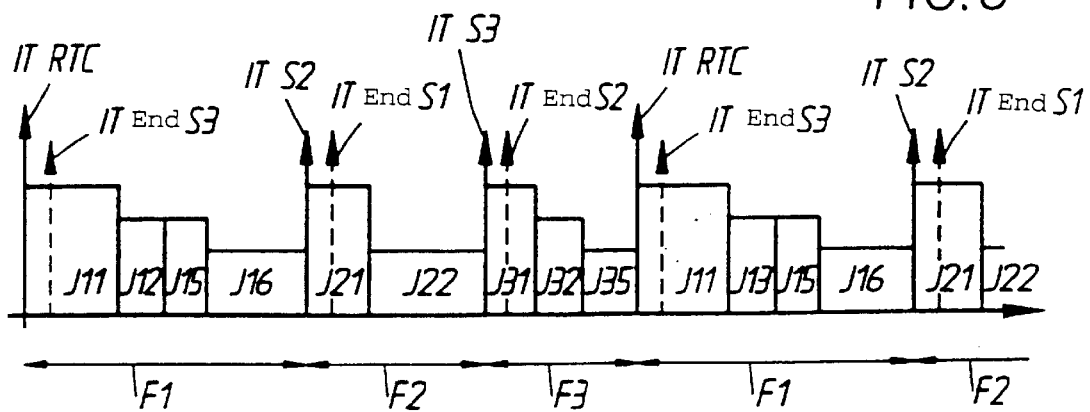
FIG. 6 illustrates the apportitioning of the use of the processor into cyclic time slices.

In accordance with FIG. 6, the method according to the invention makes it possible for one and the same processor to execute several functions separately, each comprising several tasks, the time of use of the microprocessor 70 being divided into periods by a cyclic interrupt IT RTC produced by a real time clock of the peripherals management circuit 78, the time interval between two interrupts IT RTC being itself divided into as many time slices as functions F1, F2, F3 executed by the microprocessor, by interrupts ITS2, UTS3 spaced apart as a function of the time which it is desired to allocate to each function F1, F2, F3, these interrupts also being produced by the management circuit 78.

The function F1 comprises six tasks J11 to J16, task J11 being executed at each interrupt IT RTC marking the start of the partition allocated to F1, tasks J12, J13 and J14 (which is not represented) being executed alternately following task J11, task J15 being executed at each partition allocated to F1 following one of the tasks J12, J13, J14, task J16 being executed as a background task in the time remaining from the partition allocated to F1. Likewise, the function F2 comprises two tasks J21 and J22, task J21 being executed at each interrupt ITS2 marking the start of the partition allocated to F2, and task J22 being executed as a background task in the time remaining from the partition allocated to F2. The function F3 comprises 5 tasks, namely task J31 executed following each interrupt ITS3, task J32, and tasks J33 and J34 (which are not represented), which are executed alternately following task J31, and task J35 executed as a background task in the time remaining in the partition allocated to F3.

The interrupts IT RTC, ITS2 and ITS3 are maskable, that is to say they are postponed in the case where the microprocessor executes a code sequence which must not be interrupted. To prevent an error which occurs during such a code sequence from disturbing the execution of the other functions, a nonmaskable interrupt IT EndS3, IT EndS1, IT EndS2 is generated by the peripherals management circuit 78 just after the normal end of the corresponding time slice, this interrupt being systematically deactivated by the microprocessor 70 at the end of the execution of all the tasks of each cycle.

In this way, during normal operation, this interrupt does not appear, but if the execution of a function F1, F2, F3 in respect of a given cycle exceeds the duration of the cycle, this interrupt appears, thereby making it possible in this case to prevent the activation of the function in the subsequent cycle from being delayed.

The microprocessor 70 has access to a table stored in memory 81 describing the ordering of the tasks at each cycle delimited by the interrupts IT RTC, ITS2 and ITS3, and the access rights allocated to each task. On commencing each task, the microprocessor updates the register 111 with the access right allocated to the task in this table. Additionally, provision may be made to allocate within this table, a minimum and a maximum time to the execution of each task. The processor can then access a time counter included within the peripherals management circuit 78 at the start and at the end of each task and check that the execution time thus measured lies between the minimum and maximum times. If this is not the case, it then calls up a software error manager to take the error into account and possibly halt the subsequent execution of the task or of the function concerned so as to neutralize the effects of the error.

In order to further increase the safety of operation afforded by the structuring of the space addressable by the microprocessor, the unused areas of the memories 81, 82 may be filled with code executable by the microprocessor 70 which, were it to be executed by the microprocessor, would cause for example the stoppage or shutdown thereof, and thus, the maximum time allocated to the task to be exceeded.

What is claimed is:

1. Method for the execution by a single processor of several functions each grouping together several tasks, the processor having addressing access to an addressable space including memories for a program and for data, and input and output registers allowing the processor to communicate with its environment, wherein the method comprises the steps of:

allocating a right of access to each function to be executed by the processor, dividing the space addressable by the processor into addressable partitions and associating each addressable partition with the access right of one of the functions, in such a way as to allow each function to access at least one addressable partition, dividing the time of use of the processor into cyclic time slices, and associating each cyclic time slice with the access right of one of the functions, in such a way that each function is executed in the course of at least one time slice, at the start of each new time slice, confirming that the processor has terminated the execution of the previous function, and transmitting an error signal to the processor if the execution of the previous function has not terminated, updating a current access right corresponding to the access right associated with the new time slice, and activating the tasks of the corresponding function, and during each access by the processor to an addressable partition, reading the access right associated with the accessed partition, comparing this access right with the access right associated with the current time slice, and transmitting an error signal to the processor in the case in which the comparison reveals an inconsistency.

2. Method according to claim 1, wherein the functions are executed periodically, each task having a level of criticality, the method further comprising the steps of:

dividing the partitions of the addressable space into addressable areas, and associating access rights with these areas, allocating the access rights of the areas of each addressable partition to the tasks of the function corresponding to the addressable partition as a function of the respective levels of criticality of the tasks, during the activating of each task, updating a current access right, and during each access to an addressable area, comparing the access right associated with the addressable area, with the access right of the task currently being executed.

3. Method according to claim 1, further comprising the steps of allocating each task of a minimum and maximum execution time, checking at the end of the execution of the task that the duration of execution of the task lies between these minimum and maximum times, and transmitting an error signal if this condition is not fulfilled.

4. Method according to claim 1, wherein the areas of the space addressable by the processor, which can be used at each time slice, are separated by unused areas.

5. Method according to claim 4, characterized in that the unused areas of the memories for a program and for data are filled with code executable by the processor making it possible to stop or shut down the latter, thereby making it possible to cause the exceeding of the maximum time allocated to the task currently being executed.

6. Method according to claim 1, characterized in that the access by the processor to an area of the addressable space is authorized if the access right of the current task is higher than the access right of the addressable area, for the same cyclic time slice.

7. Method according to claim 1, characterized in that the access right associated with each task contains a read-access authorization field and a write-access authorization field, the method furthermore comprising the barring of access to a memory area in the case of write-access violation, and the signalling of the barred read-accesses.

8. Device in respect of the implementing of the method according to claim 1, characterized in that it comprises:

means for dividing the space addressable by the microprocessor into addressable partitions and into addressable areas, and for allocating at least one addressable partition and at least one addressable area respectively to each function and each task executed by the microprocessor, means for dividing the time of use of the processor into cyclic time slices, and for allocating these time slices respectively to the execution of each of the functions, means for activating in succession in a predefined order the tasks of each function during the time slices allocated to the function, means for updating and storing the access rights corresponding to the task currently being executed, and means for checking during each access to an addressable area that the access rights allocated to the current task correspond to those of the addressed area.

9. Device according to claim 8, characterized in that it furthermore comprises means for checking that the execution time of each task complies with an associated minimum duration and an associated maximum duration of the task, and the transmitting of an error signal when these durations are not complied with.

10. Device according to claim 8, characterized in that it furthermore comprises means for checking the addressing planes of the space addressable by the microprocessor, this space comprising the memories and input and output registers.

11. Device according to claims 8, characterized in that the time slices are delimited by interrupts applied to the processor, which may be delayed when the processor is executing an uninterruptable program sequence.

12. Device according to claim 11, characterized in that it comprises means for generating an interrupt which is non-maskable by an uninterruptable program sequence, just after the start of a cyclic time slice in the case where, at this instant, the execution of the function in the course of the previous time slice has not terminated, and the transmitting of an error signal so as to signal that the execution of this function is erroneous.

13. Method according to claim 2, characterized in that it furthermore comprises the allocating to each task of a minimum and maximum execution time, the checking at the end of the execution of the task that the duration of execution of the task lies between these minimum and maximum times, and the transmitting of an error signal if this condition is not fulfilled.

14. Method according to claim 2, characterized in that the areas of the space addressable by the processor, which can be used at each time slice, are separated by unused areas.

15. Method according to claim 2, characterized in that the access by the processor to an area of the addressable space is authorized if the access right of the addressable area is for the same cyclic time slice.

16. Method according to claim 3, characterized in that the access by the processor to an area of the addressable space is authorized if the access right of the current task is higher than the access right of the addressable area, for the same cyclic time slice.

17. Method according to claim 4, characterized in that the access by the processor to an area of the addressable space is authorized if the access right of the current task is higher than the access right of the addressable area, for the same cyclic time slice.

18. Method according to claim 5, characterized in that the access by the processor to an area of the addressable space is authorized if the access right of the current task is higher than the access right of the addressable area, for the same cyclic time slice.

19. Method according to claim 2, characterized in that the access right associated with each task contains a read-access authorization field and a write-access authorization field, the method furthermore comprising the barring of access to a memory area in the case of write-access violation, and the signaling of the barred read-accesses.

20. Method according to claim 3, characterized in that the access right associated with each task contains a read-access authorization field and a write-access authorization field, the method furthermore comprising the barring of access to a memory area in the case of write-access violation, and the signaling of the barred read-accesses.

* * * * *